United States Patent
Bareng

(10) Patent No.: US 10,254,779 B2
(45) Date of Patent: Apr. 9, 2019

(54) AUTOMATIC AUXILIARY-POWER DETECTOR FOR POOL SYSTEMS

(71) Applicant: ZODIAC POOL SYSTEMS LLC, Vista, CA (US)

(72) Inventor: Eusebio Domingo Bareng, Vista, CA (US)

(73) Assignee: Zodiac Pool Systems LLC, Vista, CA (US)

(*) Notice: Subject to any disclaimer, the term of this patent is extended or adjusted under 35 U.S.C. 154(b) by 133 days.

(21) Appl. No.: 15/065,176

(22) Filed: Mar. 9, 2016

(65) Prior Publication Data

US 2016/0266593 A1    Sep. 15, 2016

Related U.S. Application Data

(60) Provisional application No. 62/130,355, filed on Mar. 9, 2015.

(51) Int. Cl.
    *G06F 1/26*     (2006.01)
    *G05F 1/66*     (2006.01)
    (Continued)

(52) U.S. Cl.
    CPC .............. *G05F 1/66* (2013.01); *A61H 33/00* (2013.01); *A61H 33/005* (2013.01); *G05B 15/02* (2013.01); *H02J 9/02* (2013.01); *H02J 11/00* (2013.01)

(58) Field of Classification Search
    CPC ......... G05F 1/66; A61H 33/005; A61H 33/00; G05B 15/02; H02J 11/00; H02J 9/02
    (Continued)

(56) References Cited

U.S. PATENT DOCUMENTS

| | | |
|---|---|---|
| 5,990,575 A | 11/1999 | Flaugher et al. |
| 7,602,083 B1 | 10/2009 | Czamecki et al. |
| 2009/0150704 A1* | 6/2009 | Van Bosch ......... H04M 1/7253 713/340 |

FOREIGN PATENT DOCUMENTS

| | | |
|---|---|---|
| WO | 2013182927 | 12/2013 |
| WO | 2014111824 | 7/2014 |

OTHER PUBLICATIONS

International Patent Application No. PCT/US2016/021522, International Search Report and Written Opinion, dated Jun. 3, 2016, 11 pages.

* cited by examiner

*Primary Examiner* — Tha-O H Bui
(74) *Attorney, Agent, or Firm* — Kilpatrick Townsend & Stockton LLP; Dean W. Russell; William Sparkman

(57) ABSTRACT

Systems and methods for controlling power on a communication network bus connecting an auxiliary device and a control device in a pool or spa system. The control device includes a power source for providing voltage to the device and a power detector. The auxiliary device can provide additional voltage to the control device via the communication network bus. The power detector may be capable of detecting voltage received by the control device via the communication network bus. The power detector may also be capable of detecting traffic (e.g., communication) by the control device or the auxiliary device via the bus and/or data collision on the bus. The power detector is configured to enable or disable the power source of the control device based on voltage detected on the communication network bus, traffic detected on the communication network bus, and/or data collision detected on the communication network bus.

20 Claims, 4 Drawing Sheets

(51) Int. Cl.
    *A61H 33/00*     (2006.01)
    *H02J 9/02*     (2006.01)
    *H02J 11/00*     (2006.01)
    *G05B 15/02*     (2006.01)

(58) Field of Classification Search
    USPC .......................................................... 700/298
    See application file for complete search history.

AUTOMATIC AUXILIARY-POWER DETECTOR FOR POOL SYSTEMS

REFERENCE TO RELATED APPLICATION

This application claims the benefit of U.S. Provisional Patent Application No. 62/130,355, entitled "Automatic Auxiliary Power Detection For Pool Systems," filed Mar. 9, 2015, the entire contents of which are hereby incorporated by this reference.

TECHNICAL FIELD

The present disclosure generally relates to a device for detecting power. More specifically, but not by way of limitation, this disclosure relates to a power detector for automatically detecting auxiliary power on a communication network bus in a pool or spa system.

BACKGROUND

A pool or spa system may include various devices or systems, including, for example, automation control systems, sanitation systems, filtration systems, heaters, pumps, etc. Each device or system may include a power source or may receive power from another device. The pool system may also include a communication network bus, which may allow the various devices to provide and receive power via the communication network bus. The communication network bus may also allow the various devices to communicate (e.g., transmit or receive data). It may be desirable to monitor or control power supply between the devices via the communication network bus.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Disclosed are power detectors for automatically detecting auxiliary power on a communication network bus. Auxiliary power can include additional or supplemental power provided to a device.

In one example, a control device is electrically connected to one or more auxiliary devices or other control devices via a communication network bus. The control device can be any device that includes a power source, a voltage regulator, and a power detector. The power source provides power (e.g., voltage) to the control device. The voltage regulator is connected to the power source for controlling power output from the power source. The auxiliary device is another device that can provide power to the control device via the communication network bus and/or receive power from the control device via the communication network bus. The power detector detects voltage transmitted across the communication network bus (e.g., from the auxiliary device to the control device or between control devices), and can determine if the transmitted voltage is above or below a threshold voltage (e.g., a threshold voltage for powering the control device or the auxiliary device). The power detector can also monitor (e.g. constantly detect) the voltage transmitted across the communication network bus for a set period of time to determine if the voltage is above or below the threshold voltage for the set period of time. In some examples, the power detector is configured to disable the voltage regulator associated with the power source of the control device if the transmitted voltage is above the threshold voltage. Disabling the voltage regulator prevents the power source from providing auxiliary power to the control device or the auxiliary device while the auxiliary device is transmitting the threshold voltage. In some examples, the power detector is configured to enable the voltage regulator if the voltage detected on the communication network bus is below the threshold voltage for the set period of time. Enabling the voltage regulator allows the power source of the control device to provide auxiliary power to the control device or the auxiliary device (e.g., for powering and operating the control device or the auxiliary device).

In another example, the communication network bus allows the control device(s) and the auxiliary device(s) to communicate via the bus. The power detector detects traffic (e.g., communication) or an absence of traffic on the bus. Traffic can include data being transmitted or received by the auxiliary device or the control device via the bus. In some examples, the power detector monitors the absence of traffic on the bus for a set period of time. In this example, the power detector is configured to disable the voltage regulator associated with the power source of the control device if it detects an absence of traffic on the bus for the set period of time, which can prevent the power source from providing power when the control device(s) and/or the auxiliary device(s) are idle (e.g., not transmitting or receiving data).

In still another example, the power detector can detect data collision on the communication network bus. The power detector may also monitor data collision on the bus for a set period of time. Data collision can occur when multiple devices (e.g., the auxiliary device and the control device or other devices) are simultaneously attempting to communicate via the bus. In another example, data collision can occur when multiple devices (e.g., the auxiliary device and the control device) are simultaneously attempting to provide power (e.g., transmit voltage) via the bus. In some examples, the power detector disables the voltage regulator associated with the power source of the control device if it detects data collision on the bus for the set period of time. Disabling the voltage regulator in response to detecting data collision can prevent the power source from providing power to the control device by causing the control device to reset, which can prevent additional data collisions.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
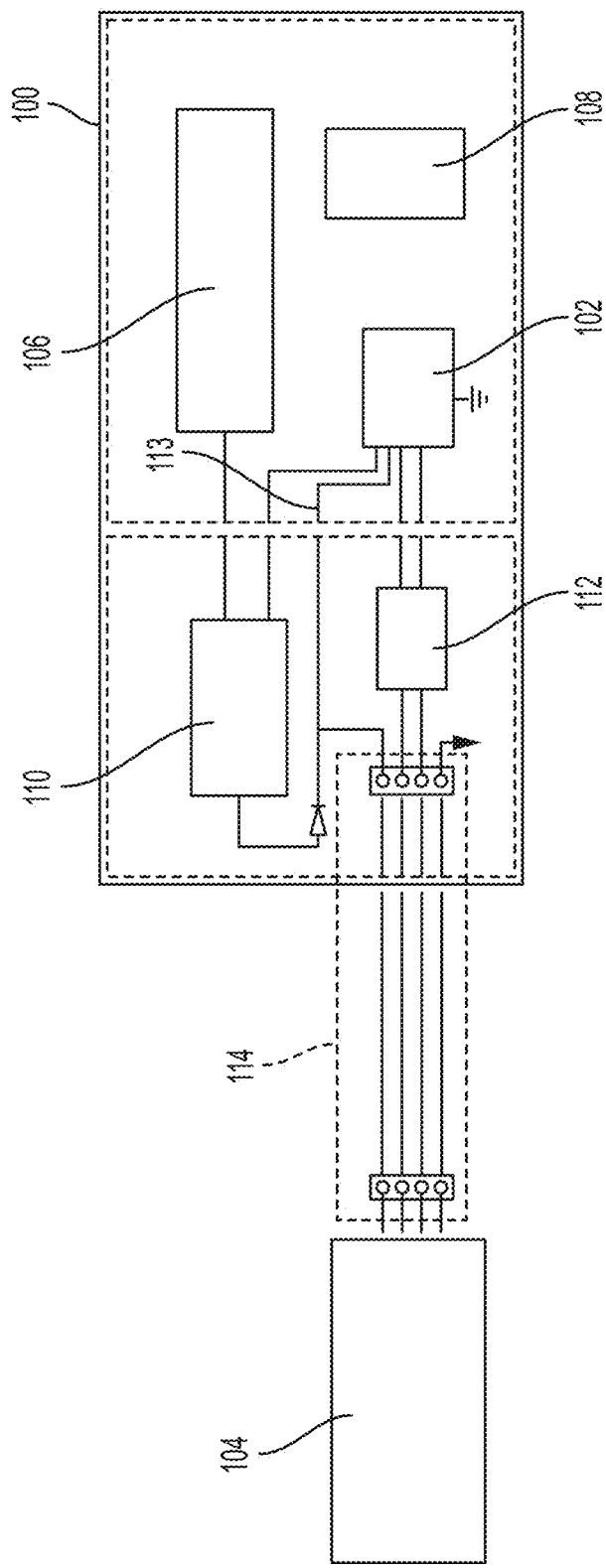
FIG. 1 is a block diagram depicting an example of a control device and an auxiliary device.

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below.

Disclosed are power detectors and other hardware for automatically detecting auxiliary power on a communication network bus.

A power detector can be used for automatically detecting auxiliary power (e.g., additional or supplemental voltage) provided by a power source via a communication network bus. In some examples, the power detector enables or disables auxiliary power for a serial or parallel communication network bus. One or more auxiliary devices or other control devices can be connected to a control device via a communication network bus. The control device may include a power source and a power detector. The control device may also include a voltage regulator connected to the power source for controlling power output from the power source. The auxiliary device is another device that can provide power to the control device and/or receive power from the control device via the communication network bus.

The power detector detects voltage transmitted across the bus (e.g., voltage transmitted across the bus from the auxiliary device to the control device or from the control device to the auxiliary device). The power detector can also monitor (e.g., constantly detect) voltage transmitted across the bus for a set period of time. The power detector can automatically disable (e.g., switch to an OFF mode) or enable (e.g., switch to an ON mode) the voltage regulator for controlling power output by the power source of the control device based on the voltage detected.

For example, the power detector can detect voltage transmitted to the control device from the one or more auxiliary devices or other control devices via the communication network bus. The power detector can determine if the voltage is above or below a threshold (e.g., a threshold voltage for operating the control device or the auxiliary device). The power detector can monitor (e.g., constantly detect) the voltage for a set period of time if the voltage is below the threshold voltage. In some examples, the power detector automatically disables the voltage regulator connected to the power source if the voltage transmitted across the bus from the one or more auxiliary devices or other control devices is above the threshold. Disabling the voltage regulator can prevent the power source from providing auxiliary (e.g., additional or supplemental) power to the control device or the one or more auxiliary devices.

In another example, the power detector automatically enables the voltage regulator if the voltage transmitted across the bus from the one or more auxiliary devices or other control devices is below the threshold for the set period of time. Enabling the voltage regulator allows the power source to provide auxiliary power to the control device (e.g., for powering and operating the control device) or the one or more auxiliary devices via the bus. Automatically disabling or enabling the voltage regulator for controlling power output by the power source of the control device helps prevent power supply conflicts between the one or more auxiliary devices' power source and the control device's power source. In one example, automatically disabling or enabling the voltage regulator in this way prevents the threshold voltage from being provided to the control device by both the one or more auxiliary devices and the power source.

In some examples, the power detector detects traffic (e.g., communication) or the absence of traffic on the communication network bus. In some instances, the power detector monitors an absence of traffic on the bus for a period of time, and disables the voltage regulator in the absence of traffic on the bus. For example, the power detector can detect an absence of traffic on the bus when the one or more auxiliary devices and the control device are not communicating via the bus. The power detector can disable the voltage regulator in the absence of traffic on the bus for the period of time. Disabling the voltage regulator can prevent the power source from providing power to the control device or one or more auxiliary devices when the one or more auxiliary devices or the control device is idle (e.g., not transmitting or receiving data via the bus).

In some examples, the power detector detects and/or monitors data collision on the communication network bus. The power detector can disable the voltage regulator of the control device in response to detecting data collision on the bus. For example, the one or more auxiliary devices and the control device may simultaneously transmit data or provide voltage via the bus, which can cause data collision. The power detector can detect the data collision on the bus and disable the voltage regulator in response to detecting data collision and monitoring the data collision for the set period of time. Disabling the voltage regulator prevents the power source from providing power to the control device, which can cause the control device to reset. Resetting the control device can prevent additional data collisions from occurring on the bus.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples, but, like the illustrative examples, should not be used to limit the present disclosure.

FIG. 1 is a block diagram depicting an example of a control device 100 and an auxiliary device 104. Control device 100 could also be connected with more than one auxiliary device and/or other control devices.

The auxiliary device 104 can be any device or system. In some examples, the auxiliary device 104 is a device for providing and/or receiving power (e.g., voltage). In some non-limiting examples, the auxiliary device 104 is a device used in a pool or spa system. Examples of the auxiliary device 104 include, but are not limited to, AQUALINK® RS from Jandy Pools, Inc., Jandy® E-Pump™ Remote Controller from Jandy Pools, Inc., a variable speed pump, home automatic systems, sanitation systems (e.g., salt water chlorine generators and the like), heaters, filters, interface boards for heaters or heat pumps, etc. The auxiliary device 104 may or may not have the capability of supplying its own power.

The control device 100 can be any device or system. In some examples, the control device 100 is a device for providing and/or receiving power. The control device 100 can be a device used in a pool or spa system. Examples of the control device 100 include, but are not limited to, AQUALINK® RS from Jandy Pools, Inc., Jandy®

E-Pump™ Remote Controller from Jandy Pools, Inc., a variable speed pump, home automatic systems, sanitation systems (e.g., salt water chlorine generators and the like), heaters, filters, interface boards for heaters or heat pumps, etc.

The control device 100 can include a power detector 102, a voltage power supply 106, a motor driver 108, a voltage regulator 110, and a transceiver 112.

The motor driver 108 can be any device for generating a signal to drive a motor. In some examples, the motor driver 108 generates a signal to drive the motor for allowing the voltage power supply 106 to provide or generate voltage. The voltage power supply 106 can be any device for providing or generating voltage, including a high voltage switching power supply. In some examples, the voltage power supply 106 can generate voltage for powering or operating the control device 100 and/or the auxiliary device 104.

The voltage power supply 106 is electrically coupled or otherwise communicatively coupled to the voltage regulator 110 for providing voltage to the voltage regulator 110. The voltage regulator 110 can be any device for regulating voltage. An example of the voltage regulator 110 includes a 10V direct current regulator. The voltage regulator 110 controls the power output by the voltage power supply 106. For example, the voltage regulator 110 receives voltage from the voltage power supply 106 and controls whether the voltage is transmitted through the voltage regulator 110 and outputted by the voltage regulator 110. For example, the voltage regulator 110 may be enabled (e.g., in an ON mode) for allowing the voltage from the voltage power supply 106 to be transmitted through the voltage regulator 110 and outputted by the voltage regulator 110. When the voltage regulator is disabled (e.g., in an OFF mode), the voltage regulator 110 receives voltage from the voltage power supply 106 but prevents the voltage from being transmitted through the voltage regulator 110. In some cases, the voltage regulator 110 and the voltage power supply 106 are integrated into a single structure, although they need not be. For example, the voltage regulator 110 and the voltage power supply 106 can be contained within a single housing or chassis.

The voltage regulator 110 is electrically coupled or otherwise communicatively coupled to the power detector 102 or another device. In some examples, the voltage regulator 110 receives a signal from the power detector 102 or another device and is enabled or disabled based on the signal.

The control device 100 is electrically coupled or otherwise communicatively coupled to the auxiliary device 104 and/or other control devices via a bus 114 (e.g., a communication network bus or any other suitable interface). An example of the bus 114 includes, but is not limited to, an RS485 bus. In some examples, the auxiliary device 104 and the control device 100 can transmit and/or receive power via the bus 114. In some cases, the auxiliary device 104 and the control device can communicate (e.g., transmit and/or receive data) via the bus 114.

The transceiver 112 can be any device for transmitting or receiving data or voltage. In some examples, the transceiver is electrically coupled to the auxiliary device 104 and the power detector 102. In some cases, for example if the auxiliary device 104 is capable of generating voltage, the auxiliary device 104 transmits voltage to the transceiver 112 via the bus 114. The voltage can be used for powering or operating the control device 100. In another example, the auxiliary device 104 can transmit data to the control device 100 via the bus 114 and the transceiver 112. Similarly, the control device 100 can transmit voltage (e.g., voltage from the voltage power supply 106) to the auxiliary device 104 via the transceiver 112 and the bus 114. The voltage can be used for powering the auxiliary device 104. In another example, the control device 100 can transmit data to the auxiliary device 104 via the transceiver 112 and the bus 114.

In some examples, the power detector 102 can automatically detect voltage transmitted across the bus 114 (e.g., voltage transmitted by the auxiliary device 104). The power detector 102 may also monitor the voltage transmitted across the bus 114 for a set period of time. The power detector 102 may enable or disable the voltage regulator 110 for controlling power supply from the voltage power supply 106 based on the voltage detected.

For example, the voltage regulator 110 may initially be in a disabled mode (e.g., an OFF mode). The voltage regulator 110 may prevent voltage from the voltage power supply 106 from being outputted when the voltage regulator 110 is disabled, which prevents the voltage power supply 106 from powering the control device 100 and also prevents voltage from the power supply 106 from being transmitted across the bus 114 to the auxiliary device 102.

As mentioned, the power detector 102 can detect voltage transmitted by the auxiliary device 104 to the control device 100 via the bus 114. In some examples, the power detector 102 can monitor the voltage provided by the auxiliary device 104 for a set period of time (e.g., two seconds or other suitable period of time). The power detector 102 can automatically enable the voltage regulator 110 if the voltage detected is below a threshold voltage (e.g., a threshold voltage for powering or operating the control device 100 or another device) for the set period of time. As an example, the power detector 102 may transmit a signal to the voltage regulator 110 switching the voltage regulator to an enabled mode (e.g., an ON mode) in response to determining that the voltage detected is below the threshold voltage for two seconds. Enabling the voltage regulator 110 allows voltage from the voltage power supply 106 to be transmitted through the voltage regulator 110 for powering the control device 100 and/or for powering another device (e.g., the auxiliary device 104) via the bus 114. As another example, the power detector 102 may not transmit a signal to the voltage regulator 110 if the voltage detected is above the threshold (e.g., the auxiliary device 104 is already providing voltage above the threshold), in which case the voltage regulator 110 will remain in a disabled mode and prevent the voltage power supply 106 from providing auxiliary or additional voltage while the auxiliary device is providing the threshold voltage.

In another example, the voltage regulator 110 is in an enabled mode, allowing voltage from the voltage power supply 106 to be transmitted through the voltage regulator 110. The power detector 102 detects voltage transmitted by the auxiliary device 104 to the control device 100 via the bus 114 and monitors the voltage transmitted for a set period of time. The power detector 102 can automatically disable the voltage regulator in response to determining that the voltage detected is above a threshold voltage. As an example, the power detector 102 can transmit a signal to the voltage regulator 110 switching the voltage regulator to a disabled mode (e.g., an OFF mode) in response to determining that the voltage detected is above the threshold voltage. Disabling the voltage regulator 110 prevents voltage from the voltage power supply 106 from being outputted by the voltage regulator 110, which prevents the voltage power supply 106 from providing voltage to the control device 100 while the auxiliary device is transmitting the threshold voltage to the control device 100.

In some examples, the power detector 102 also detects traffic (e.g., communication) or an absence of traffic (e.g., no communication) on the bus 114. The power detector 102 may also monitor an absence of traffic on the bus 114 for a set period of time. Traffic on the bus may indicate that devices (e.g., the control device 100 and the auxiliary device 104) are electrically coupled via the bus 114, or may indicate that a device electrically coupled to the bus is attempting to communicate (e.g., transmit or receive data) with another device via the bus 114.

The power detector 102 may detect traffic on the bus when the control device 100 is attempting to communicate with another device (e.g., the auxiliary device 104) via the bus 114, or vice versa. The power detector 102 may detect an absence of traffic on the bus when the control device 100 or the auxiliary device 104 is disconnected from the bus 114. As another example, the power detector 102 may detect an absence of traffic on the bus when the control device 100 or the auxiliary device 104 is not attempting to communicate via the bus 114. In some cases, the power detector 102 detects the absence of traffic on the bus and disables the voltage regulator in response to detecting the absence of traffic.

For example, the voltage regulator 110 may be in an enabled mode. The power detector 102 can detect an absence of traffic on the bus 114. The power detector 102 can also monitor the absence of traffic for a set period of time (e.g., thirty seconds or other suitable period of time). The power detector 102 can transmit a signal to the voltage regulator 110 disabling the voltage regulator 110 if it determines there is no traffic on the bus 114 for the set period of time.

In some examples, the power detector 102 is also capable of detecting data collision on the bus 114. Data collision can occur on the bus 114 when multiple devices (e.g., the control device 100 and the auxiliary device 104 or other devices) are simultaneously attempting to communicate (e.g., transmit a signal) via the bus 114. In some examples, the power detector 102 monitors data collision on the bus for a set period of time and disables the voltage regulator 110 if it detects data collision on the bus for the set period of time. For example, the power detector 102 can detect data collision on the bus 114 when the auxiliary device 104 and the control device 100 are simultaneously transmitting signals via the bus 114. The power detector 102 can monitor the data collision for a set period of time (e.g., ten seconds or other suitable period of time). In this case, the power detector 102 can transmit a signal to the voltage regulator 110 disabling the voltage regulator 110 in response to detecting and monitoring data collision on the bus for the set period of time.

Although only a control device 100 and auxiliary device 104 are illustrated in FIG. 1, additional devices, such as additional control and/or auxiliary devices, may be connected to the bus 114. If additional devices are connected to the bus, the power detector 102 can be configured to detect and monitor voltage and/or traffic and/or detect collisions across the bus 114 as described above.

In some examples, the control device 100 may be electrically coupled or otherwise coupled to a pool device for use in a pool or spa system via the bus 114. The control device 100 may provide power to the pool device via the bus 114. For example, FIG. 2 is a block diagram depicting the control device 100 of FIG. 1, along with a pool device 200 for use in a pool or spa system.

The pool device 200 can be any device for use with a pool or spa system. In some examples, the pool device 200 can be a device for receiving power. Examples of the pool device 200 include, but are not limited to, AQUALINK® RS from Jandy Pools, Inc., Jandy® E-Pump™ Remote Controller from Jandy Pools, Inc., a variable speed pump, home automatic systems, sanitation systems (e.g., salt water chlorine generators and the like), heaters, filters, interface boards for heaters or heat pumps, etc.

As illustrated, the control device 100 includes components configured in substantially the same manner as described with respect to FIG. 1. In some examples, the pool device 200 may not include a power source or may not provide voltage to the control device 100 via the bus 114. In the example depicted in FIG. 2, the power detector 102 can detect voltage transmitted by the pool device 200 to the control device 100 via the bus 114 and determine if the voltage is below a threshold voltage (e.g., a threshold voltage for powering or operating the pool device 200) for a set period of time (e.g., two seconds or other suitable period of time). If the power detector 102 detects that the voltage detected is below the threshold voltage for the set period of time, the power detector 102 transmits a signal to the voltage regulator 110 to enable the voltage regulator 110. Enabling the voltage regulator 110 allows voltage from the voltage power supply 106 to be transmitted through the transceiver 112 and received by the pool device 200 via the bus 214 for powering the pool device 200.

Figure 2:
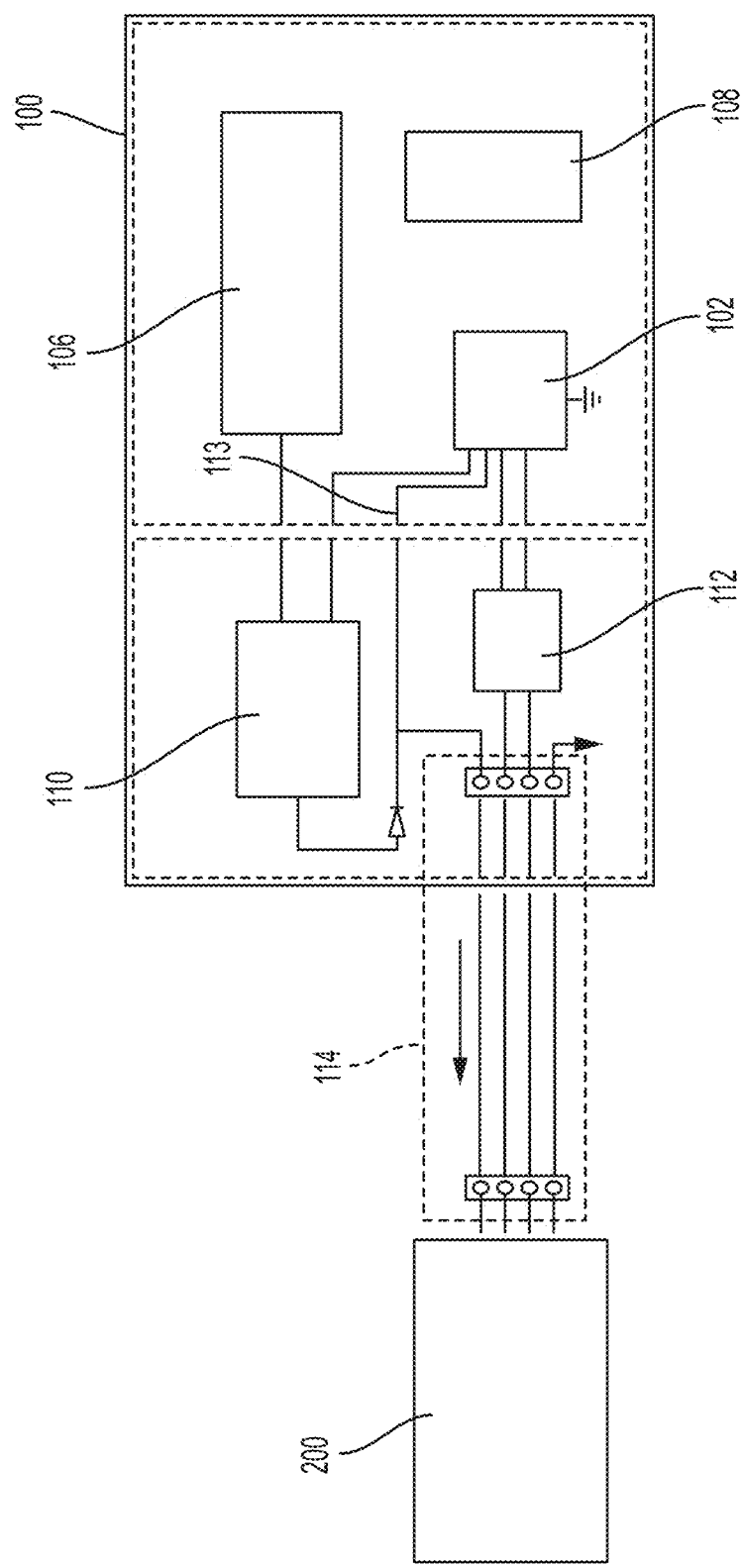
FIG. 2 is a block diagram depicting the control device of FIG. 1, along with a pool device for use in a pool or spa system according to one example.
Figure 3:
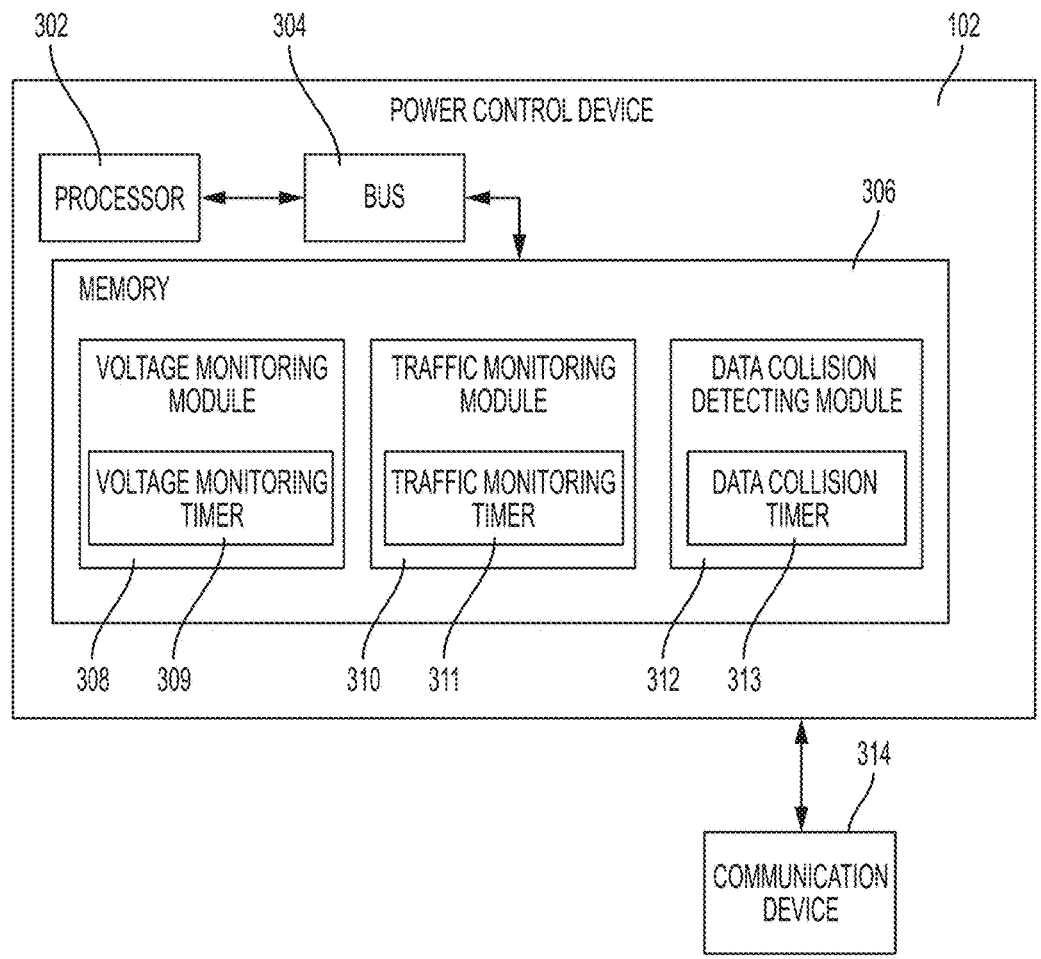
FIG. 3 is a block diagram depicting an example of a power detector for automatically detecting auxiliary power on a communication network bus.

FIG. 3 is a block diagram depicting an example of a power detector 102 for automatically detecting auxiliary power on a communication network bus (e.g., the bus 114 of FIGS. 1-2). The power detector 102 can include a processor 302, a memory 306, a bus 304, and a communication device 314. In some examples, the components shown in FIG. 3 (e.g., the processor 302, the bus 304, the memory 306, and the communication device 314) are integrated into a single structure. For example, the components can be housed within a single housing or chassis. In other examples, the components shown in FIG. 3 are distributed (e.g., in separate housings) and in electrical communication with each other.

The processor 302 can execute one or more operations for operating the power detector 102. The processor 302 can execute instructions stored in the memory 306 to perform the operations. The processor 302 can include one processing device or multiple processing devices. Non-limiting examples of the processor 302 include a Field-Programmable Gate Array ("FPGA"), an application-specific integrated circuit ("ASIC"), a microprocessor, etc.

The processor 302 can be communicatively coupled to the memory 306 via the bus 304. The memory 306 may include any type of memory device that retains stored data when powered off. Non-limiting examples of the memory 306 include electrically erasable and programmable read-only memory ("EEPROM"), flash memory, or any other type of non-volatile memory. In some examples, at least some of the memory 306 can include a computer-readable medium from which the processor 302 can read instructions. The computer-readable medium can include electronic, optical, magnetic, or other storage devices capable of providing the processor 302 with computer-readable instructions or other program code. Non-limiting examples of computer readable-medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The power detector 102 can transmit a signal via the communication device 314. For example, the power detector 102 can transmit a signal to a voltage regulator (e.g., the voltage regulator 110 of FIGS. 1-2) via the communication device 314. In some examples, the communication device 314 can represent one or more of any components that facilitate a network connection. In some examples, the communication device 314 can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication device 314 can be wired and can include such interfaces such as Ethernet, USB, IEEE 1394, or a fiber optic interface. In another example, the communication device 314 can include any suitable interface.

The memory 306 can include various modules 308, 310, 312, and 313 for detecting or controlling power on a communication network bus (e.g., the bus 114 of FIG. 1). The memory 306 can include a voltage monitoring module 308 for detecting voltage on a communication network bus (e.g., the bus 114 of FIG. 1). The voltage monitoring module 308 can include instructions for causing the power detector 102 to detect voltage transmitted across the bus (e.g., voltage transmitted across the bus 114 by auxiliary device 104 of FIG. 1 or the pool device 200 of FIG. 2).

In some examples, the voltage monitoring module 308 can include instructions for causing the power detector 102 to recognize a threshold voltage transmitted across the bus and determine if the detected voltage is above or below the threshold voltage. The threshold voltage can correspond to a level of voltage for powering or operating a device (e.g., the control device 100 of FIG. 1, auxiliary device 104 of FIG. 1, pool device 200 of FIG. 2, or another device). For example, the voltage monitoring module 308 can include instructions for causing the power detector 102 to receive data (e.g., from a computing device) indicating the threshold voltage. In another example, the voltage monitoring module 308 can include instructions for causing the power detector 102 to recognize a stored threshold voltage. The voltage monitoring module 308 can include instructions for causing the processor 302 to execute operations for comparing the detected voltage to the threshold voltage for determining if the detected voltage is above or below the threshold voltage.

In some examples, the voltage monitoring module 308 can include a voltage monitoring timer 309. The voltage monitoring module 308 can include instructions for setting the voltage monitoring timer 309 to cause the power detector 102 to monitor voltage transmitted across the bus for a set period of time. For example, the voltage monitoring module 308 can include instructions for causing the power detector 102 to monitor voltage transmitted across the bus for two seconds, or any other desired time. In some examples, the voltage monitoring module 308 can include instructions for causing the power detector 102 to determine an amount of time that the power detector 102 has detected the voltage transmitted across the bus. As an example, the voltage monitoring module 308 can include instructions for causing the power detector 102 to determine that the power detector 102 has detected voltage transmitted across the bus for one second or other suitable period of time. In some examples, the voltage monitoring module 308 can include instructions for causing the power detector 102 to continue monitoring voltage transmitted across the bus for an additional time period if the amount of time that the power detector 102 has monitored voltage is less than the set period of time for monitoring voltage. As a non-limiting example, the voltage monitoring module 308 can include instructions for causing the power detector 102 to determine that the power detector 102 has monitored voltage for one second and that the power detector 102 has not monitored the voltage for the set period of time of two seconds. The voltage monitoring module 308 can include instructions for causing the power detector 102 to continue to monitor the voltage for an additional one second (or other suitable interval) in response to determining that the power detector 102 has not monitored the voltage for the set period of time.

The voltage monitoring module 308 can also include instructions for causing the power detector 102 to transmit a signal to a voltage regulator (e.g., the voltage regulator 110 of FIG. 1) in response to determining that the voltage detected across the bus is below the threshold voltage. In some examples, the voltage monitoring module 308 can include instructions for causing the power detector 102 to transmit the signal to the voltage regulator in response to determining that the voltage detected across the bus is below the threshold voltage and that the power detector has monitored the voltage across the bus for a set period of time. The voltage regulator will then become disabled (e.g., switched to an OFF mode) based on the signal received from the power detector 102. In some examples, the power detector 102 can transmit the signal via the communication device 314. As another non-limiting example, the voltage monitoring module 308 can include instructions for causing the power detector 102 to transmit a signal to the voltage regulator 110 to enable the voltage regulator 110 in response to determining that the voltage transmitted across the bus is below the threshold voltage and the power detector 102 has monitored the voltage for two seconds.

In some examples, the memory 306 can include a traffic monitoring module 310. The traffic monitoring module 310 can include instructions for causing the power detector 102 to detect or monitor traffic on a bus (e.g., the bus 114 of FIG. 1). In some examples, the traffic monitoring module 310 can also include instructions for causing the power detector 102 to detect an absence of traffic on the bus.

In some examples, the traffic monitoring module 310 can include a traffic monitoring timer 311. The traffic monitoring module 310 can include instructions for setting the traffic monitoring timer 311 to cause the power detector 102 to monitor traffic or an absence of traffic on the bus for a set period. For example, the traffic monitoring module 310 can include instructions for causing the power detector 102 to monitor an absence of traffic on the bus for thirty seconds or other suitable period of time. In some examples, the traffic monitoring module 310 can include instructions for causing the power detector 102 to determine an amount of time that the power detector 102 has monitored the absence of traffic on the bus. As an example, the traffic monitoring module 310 can include instructions for causing the power detector 102 to determine that the power detector 102 has detected an absence of traffic on the bus for twenty seconds or other period of time less than the set period of time. In some examples, the traffic monitoring module 310 can include instructions for causing the power detector 102 to continue detecting or monitoring the traffic across the bus for an additional time period if the amount of time that the power detector 102 has monitored traffic across the bus is less than the set period of time for monitoring the traffic. As an example, the traffic monitoring module 310 can include instructions for causing the power detector 102 to determine that the power detector 102 has monitored traffic for twenty seconds and that the power detector 102 has not monitored the traffic for the set period of time of thirty seconds. The traffic monitoring module 310 can include instructions for causing the power detector 102 to continue to monitor the traffic for an additional ten seconds in response to determining that the power detector 102 has not monitored the traffic for the set period of time.

The traffic monitoring module 310 can also include instructions for causing the power detector 102 to transmit a signal to the voltage regulator in response to determining that no traffic has been detected on the bus for a set period of time. For example, the voltage regulator can become disabled (e.g., switched to an OFF mode) based on the signal received from the power detector 102. As an example, the traffic monitoring module 310 can include instructions for causing the power detector 102 to transmit a signal to the voltage regulator disabling the voltage regulator in response to determining that no traffic has been detected on the bus for the set period of time (e.g., thirty seconds or other period of time).

In some examples, the memory 306 can include a data collision detecting module 312. The data collision detecting module 312 can include instructions for causing the power detector 102 to detect data collision or data error on a bus (e.g., the bus 114 of FIG. 1).

In some examples, the data collision detecting module 312 can include a data collision timer 313. The data collision detecting module 312 can include instructions for setting the data collision timer 313 to cause the power detector 102 to monitor data collision on the bus for a set period of time. For example, the data collision detecting module 312 can include instructions for causing the power detector 102 to monitor data collision on the bus for ten seconds or other suitable period of time. In some examples, the data collision detecting module 312 can include instructions for causing the power detector 102 to determine an amount of time that the power detector 102 has monitored data collision on the bus. As an example, the data collision detecting module 312 can include instructions for causing the power detector 102 to determine that the power detector 102 has monitored data collision on the bus for five seconds or other period of time less than the set period of time. In some examples, the data collision detecting module 312 can include instructions for causing the power detector 102 to continue detecting or monitoring data collision on the bus for an additional time period if the amount of time that the power detector 102 has monitored data collision on the bus is less than the set period of time for monitoring data collision on the bus. As an example, the data collision detecting module 312 can include instructions for causing the power detector 102 to determine that the power detector 102 has monitored data collision for five seconds and that the power detector 102 has not monitored data collision for the set period of time of ten seconds. The data collision detecting module 312 can include instructions for causing the power detector 102 to continue to monitor data collision for an additional five seconds in response to determining that the power detector 102 has not monitored data collision for the set period of time.

The data collision detecting module 312 can include instructions for causing the power detector 102 to transmit a signal to the voltage regulator in response to detecting data collision or data error on the bus for a set period of time. In some examples, the voltage regulator may become disabled based on the signal received from the power detector 102. As an example, the data collision detecting module 312 can include instructions for causing the power detector 102 to transmit a signal to the voltage regulator in response to detecting data collision on the bus and in response to determining that the power detector 102 has detected data collision on the bus for ten seconds or other suitable period of time. In some examples, the voltage regulator can become disabled based on the signal received from the power detector 102.

Figure 4:
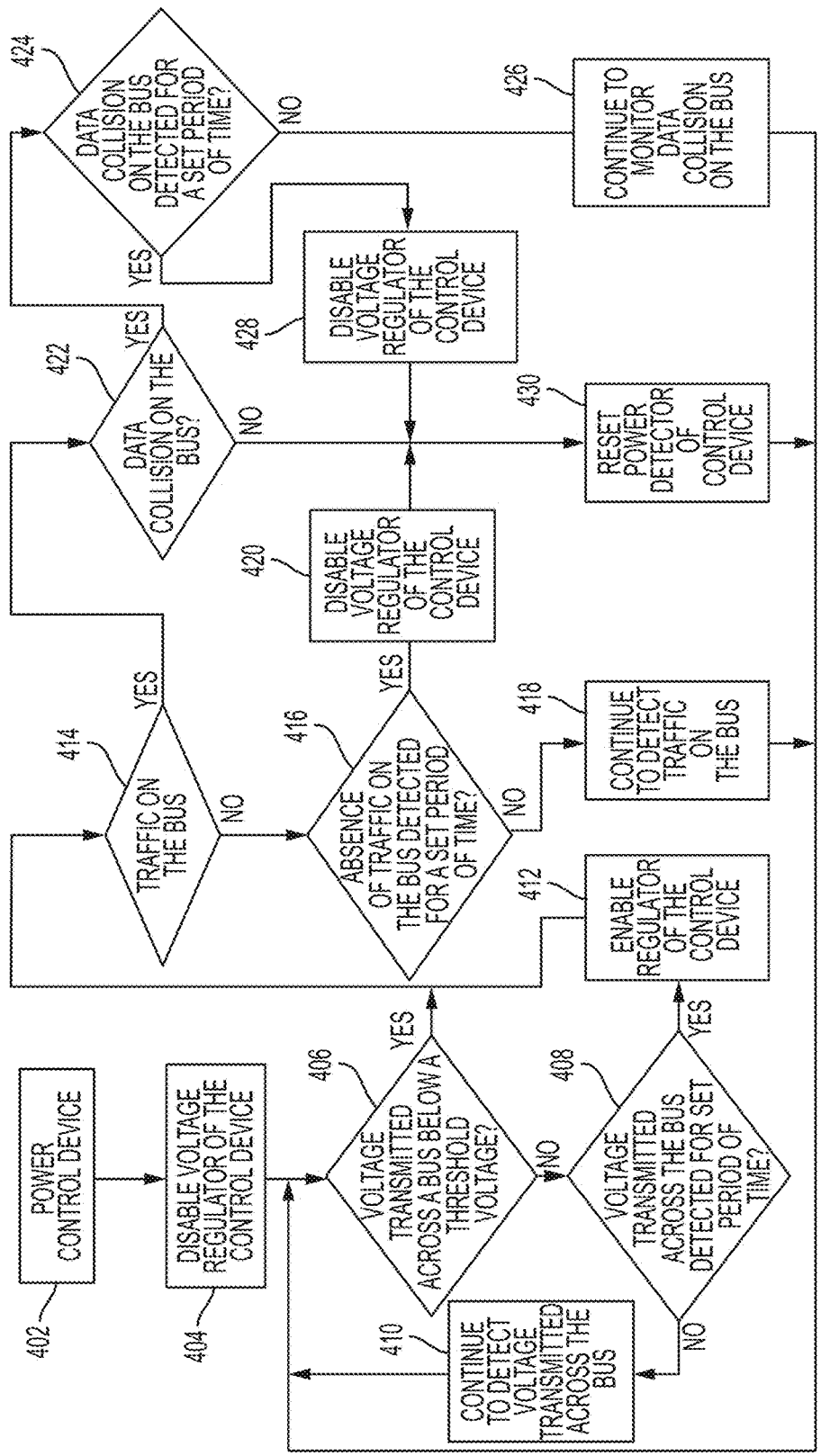
FIG. 4 is a flow chart depicting an example of a process for automatically detecting auxiliary power on a communication network bus.

FIG. 4 is a flow chart depicting a non-limiting example of a process for automatically detecting auxiliary power on a communication network bus.

In block 402, a control device is powered on. The control device can be any device such as, but not limited to, a device for use in a pool or spa system. Examples of the control device include, but are not limited to, AQUALINK® RS from Jandy Pools, Inc., Jandy® E-Pump™ Remote Controller from Jandy Pools, Inc., a variable speed pump, home automatic systems, sanitation systems (e.g., salt water chlorine generators and the like), heaters, filters, interface boards for heaters or heat pumps, etc. The control device can be substantially the same as the control device 100 of FIG. 1 and can include a power detector (e.g., the power detector 102), a voltage power supply (e.g., the voltage power supply 106), a voltage regulator (e.g., the voltage regulator 110), and a transceiver (e.g., the transceiver 112). The control device may be electrically coupled to one or more auxiliary devices (e.g., the auxiliary device 104 of FIG. 1 and/or the pool device 200 of FIG. 2 or others) via a bus (e.g., the bus 114 of FIG. 1). The auxiliary device or other device can transmit voltage to the control device or receive voltage from the control device via the bus.

In block 404, the voltage regulator of the control device is disabled. Disabling the voltage regulator can set the voltage regulator to an OFF mode. In some examples, the power detector can include a memory that includes instructions for causing the power detector to transmit a signal to the voltage regulator to disable the voltage regulator as described above.

In block 404, a voltage monitoring timer (e.g., the voltage monitoring timer 309 of FIG. 3) can be set to zero seconds. Setting the voltage monitoring timer to zero seconds can indicate that the power detector is not monitoring voltage transmitted across the bus. In some examples, the voltage monitoring timer can be set to zero seconds using a voltage monitoring module (e.g., the voltage monitoring module 308 of FIG. 3) as described above.

In block 406, the power detector of the control device detects voltage transmitted across the bus (e.g., to the control device) and determines if the voltage is above or below a threshold voltage. The threshold voltage can be a level of voltage for powering or operating the control device or another device (e.g., the auxiliary device 104 of FIG. 1 or the pool device 200 of FIG. 2 or other device). For example, the power detector can include memory (e.g., the memory 306 of FIG. 3) that includes instructions for causing the power detector to monitor voltage provided to the control device via the bus. The memory can include instructions for causing the power detector to receive data representing the threshold voltage (e.g., from a computing device) or for recognizing a stored threshold voltage (e.g., a threshold voltage stored in the memory). The power detector can detect voltage provided to the control device via the bus and compare the detected voltage to the threshold voltage to determine if the detected voltage is above or below the threshold voltage.

If the detected voltage is above the threshold voltage, the voltage regulator stays disabled and the system moves to block 414, described below.

If the voltage transmitted across the bus is below the threshold voltage (e.g., at block 406), the power detector at block 408 determines if the voltage transmitted across the bus has been detected or monitored (e.g., constantly detected) for a set period of time. In some examples, the power detector can include memory that includes instructions for causing the power detector to monitor the voltage for a set period of time (e.g., two seconds or other suitable period of time). The memory can also include instructions for determining an amount of time that the power detector has monitored voltage transmitted to the control device via the bus. The memory can also include instructions for comparing the amount of time that the power detector has monitored voltage to the set period of time for monitoring voltage to determine if the power detector has monitored voltage for the set period of time.

If the power detector has monitored the voltage for the set period of time, the system proceeds to block 412, discussed below.

If the power detector has not monitored the voltage for the set period of time (e.g., at block 408), the power detector at block 410 continues to monitor the voltage provided transmitted across the bus. In some examples, the power detector includes memory that includes instructions for causing the power detector to continue to monitor the voltage in response to determining that the power detector has not monitored the voltage for the set period of time (e.g., at block 408). As an example, the memory can include instructions for causing the power detector to determine that the power detector has monitored transmitted across the bus for one second and has not monitored voltage transmitted across the bus for the set period of time of two seconds. The memory can include instructions for causing the power detector to monitor voltage transmitted across the bus for an additional period of time (e.g., one second). In some examples, as shown in FIG. 4, the power detector continues to monitor the voltage to determine if the voltage is above or below the threshold voltage (e.g., at block 406) until the voltage detected by the power detector is above the threshold voltage (e.g., at block 406) or until the power detector has monitored the voltage for the set period of time (e.g., at block 408).

In block 412, the power detector enables the voltage regulator of the control device in response to determining: i) the voltage provided to the control device via the bus is below the threshold voltage; and ii) the power detector has monitored the voltage for the set period of time. In some examples, the power detector can include memory that includes instructions for causing the power detector to transmit a signal to the voltage regulator in response to determining that voltage detected is below the threshold voltage (e.g., at block 406) and that the power detector has monitored the voltage for the set period of time (e.g., at block 408). As described above, the voltage regulator may become enabled based on the signal received from the power detector. Enabling the voltage regulator can allow voltage from the voltage power supply of the control device (e.g., the voltage power supply 106 of FIG. 1) to be transmitted through the voltage regulator for powering the control device or another device (e.g., the auxiliary device 104, the pool device 200 of FIG. 2, or one or more other devices).

In block 414, the power detector detects traffic or an absence of traffic on the bus (e.g., the bus 114 of FIG. 1) in response to determining either that the voltage provided to the control device via the bus is above the voltage threshold (e.g., at block 406) or in response to enabling the voltage regulator (e.g., at block 412). In some examples, the power detector can include memory that includes instructions for causing the power detector to detect and monitor traffic or the absence of traffic on the bus for a set period of time.

If there is traffic on the bus, the system moves to block 422, discussed below.

If the power detector determines there has been an absence of traffic (e.g., at block 414), the power detector determines in block 416 whether the absence has been detected for a set period of time. In some examples, the power detector can include memory that includes instructions for causing the power detection device to detect the absence of traffic on the bus for a set period of time (e.g., thirty seconds or other suitable period of time). The memory can also include instructions for determining an amount of time that the power detector has detected the absence of traffic on the bus. The memory can also include instructions for comparing the amount of time that the power detector has detected the absence of traffic to determine if the power detector has detected the absence of traffic on the bus for the set period of time.

If the absence of traffic has been detected for the set period of time, the system moves to block 420, discussed below.

If the absence of traffic has not been detected for the set period of time (e.g., at block 416), the power detector continues at block 418 to detect or monitor traffic on the bus. In some examples, the power detector can include memory that includes instructions for causing the power detector to continue to monitor traffic on the bus in response to determining that the power detector has not detected the absence of traffic on the bus for the set period of time (e.g., at block 416). As an example, the memory can include instructions for causing the power detector to determine that the power detector has detected the absence of traffic on the bus for twenty seconds and has not detected the absence of traffic for the set period of time of thirty seconds. The memory can include instructions for causing the power detector to detect traffic or the absence of traffic on the bus for an additional period of time (e.g., ten seconds or other suitable time). In some examples, the system returns to block 406 and the power detector continues to monitor the voltage transmitted across the bus (e.g., at block 406) in response to determining that the power detector has not detected traffic or an absence of traffic on the bus for the set period of time.

In block 420, once the absence of traffic has been detected for the set period of time, the power detector transmits a signal to the voltage regulator to disable the voltage regulator. In some examples, the power detector can include memory that includes instructions for causing the power detector to transmit the signal to the voltage regulator in response to determining that no traffic is detected on the bus (e.g., at block 414) and that the power detector has monitored traffic on the bus for a set period of time (e.g., at block 416). The voltage regulator may become disabled based on the signal received from the power detector. Disabling the voltage regulator prevents voltage from a power source (e.g., the voltage power supply 106 of FIG. 1) from being outputted by the voltage regulator, which can prevent voltage from being provided to the control device and/or one or more auxiliary devices when there is no traffic on the bus. In some examples, in block 420, the voltage monitoring timer (e.g., the voltage monitoring timer 309 of FIG. 3) can be set to zero. Setting the voltage monitoring timer to zero causes the power detector to stop monitoring voltage transmitted to the control device via the bus.

If traffic was detected on the bus at block 414, the power detector can detect data collision on the bus at block 422 for determining if there is data collision on the bus. In some examples, the power detector can include memory that includes instructions for causing the power detector to detect or monitor data collision on the bus.

If a data collision is not detected on the bus (e.g., at block 422), the system moves to block 430, discussed below.

If a data collision is detected on the bus (e.g., at block 422), the power detector determines at block 424 if data collision on the bus has been detected on the bus for a set period of time. In some examples, the power detector can include memory that includes instructions for causing the power detector to monitor data collision on the bus for a set period of time (e.g., ten seconds or other suitable time). The memory can also include instructions for determining an amount of time that the power detector has monitored data collision on the bus. The memory can also include instructions for comparing the amount of time that the power detector has monitored data collision on the bus to the set period of time for monitoring data collision to determine if the power detector has monitored data collision for the set period of time.

If the data collision has not been detected for the set period of time (e.g., at 424), the power detector at block 426 continues to detect or monitor data collision on the bus. In some examples, the power detector can include memory that includes instructions for causing the power detector to continue to monitor data collision on the bus in response to determining that the power detector has not monitored data collision on the bus for the set period of time. As an example, the memory can include instructions for causing the power detector to determine that the power detector has detected or monitored data collision on the bus for five seconds (or other elapsed time) and that the power detector has not monitored data collision on the bus for the set period of time of ten seconds (or other suitable period of time). The memory can include instructions for causing the power detector to monitor data collision on the bus for an additional period of time (e.g., five seconds). In some examples, the system returns to block 406 and the power detector continues to monitor the voltage transmitted across the bus (e.g., at block 406) in response to determining that the power detector has not monitored data collision on the bus for the set period of time.

If the data collision has been detected for the set period of time (e.g., at 424), the power detector at block 428 transmits a signal to the voltage regulator to disable the voltage regulator. In some examples, the power detector can include memory that includes instructions for causing the power detector to disable the voltage regulator in response to determining that there is data collision on the bus (e.g., at block 422) and that the power detector has detected data collision on the bus for a set period of time (e.g., at block 424). Disabling the voltage regulator prevents voltage from being outputted by the voltage regulator, which prevents voltage from being provided to the control device and/or auxiliary devices while data collision is occurring on the bus. In some examples, disabling the voltage regulator may allow the control device to reset (e.g., be temporarily suspended) before attempting to communicate via the bus, which can prevent further data collision on the bus.

In block 430, the power detector of the control device can reset. In some examples, the power detector can include memory that includes instructions for causing the power detector to reset (e.g., at block 430) in response to determining: i) there is no traffic on the bus (e.g., at block 414); ii) the power detector has monitored traffic on the bus for a set period of time (e.g., at block 416); and the voltage regulator is disabled (e.g., at block 420). In another example, the memory can include instructions for causing the power detector to reset (e.g., at block 430) in response to determining: i) there is data collision on the bus (e.g., at block 422); the power detector has monitored data collision on the bus for a set period of time (e.g., at block 424); and the voltage regulator is disabled (e.g., at block 428). In another example, the memory can include instructions for causing the power detector to reset (e.g., at block 430) in response to determining there is not a data collision on the bus (e.g., at block 422). Resetting the power detector returns the system to block 406 so the power detector begins detecting voltage transmitted to the control device via the bus (e.g., at block 406). In some examples, resetting the power detector can interrupt operation of the control device, which may cause the power detector to begin detecting voltage transmitted to the control device via the bus (e.g., at block 406).

The disclosed systems can be retrofit with existing systems with communication buses.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An auxiliary power detection system for a pool or spa comprising:
   a control device that is couplable to at least one auxiliary device via a communication network bus, wherein the control device comprises:
      a power source that powers the control device;
      a regulator communicatively coupled to the power source, wherein the regulator is configured to receive voltage from the power source and wherein the regulator outputs the received voltage when enabled and prevents output of the received voltage when disabled; and
      a power detector communicatively coupled to the regulator, wherein the power detector is configured to detect an amount of auxiliary voltage received by the control device from the auxiliary device via the communication network bus and wherein the power detector enables or disables the regulator based on the detected amount of the auxiliary voltage.

2. The system of claim 1, wherein the auxiliary device comprises an auxiliary power source for providing the auxiliary voltage to the control device via the communication network bus.

3. The system of claim 1, wherein the power detector comprises:
   a processing device; and
   a memory device in which instructions executable by the processing device are stored for causing the processing device to:
      detect the auxiliary voltage received by the control device from the auxiliary device;
      determine when the auxiliary voltage received by the control device is above or below a threshold voltage by comparing the auxiliary voltage received to the threshold voltage, the threshold voltage corresponding to a level of voltage for powering the control device or the auxiliary device; and
      transmit a signal to the regulator for enabling the regulator in response to determining that the auxiliary voltage received is below the threshold voltage and for disabling the regulator in response to determining that the auxiliary voltage received is above the threshold voltage.

4. The system of claim 3, wherein the memory device further comprises instructions executable by the processing device for causing the processing device to:
   transmit the signal to the regulator for disabling the regulator in response to determining that the auxiliary voltage received by the control device is above the threshold voltage.

5. The system of claim 3, wherein the memory device further comprises instructions executable by the processing device for causing the processing device to:
   detect the auxiliary voltage received by the control device from the auxiliary device for a set period of time in response to determining that the auxiliary voltage received is below the threshold voltage; and
   transmit the signal to the regulator for enabling the regulator in response to determining that the auxiliary voltage received by the control device has been detected for the set period of time and the auxiliary voltage received by the control device is below the threshold voltage.

6. The system of claim 3, wherein the memory device further comprises instructions executable by the processing device for causing the processing device to:
   detect a presence or an absence of traffic on the communication network bus; and
   transmit the signal to the regulator for disabling the regulator in response to detecting the absence of traffic on the communication network bus.

7. The system of claim 6, wherein the memory device further comprises instructions executable by the processing device for causing the processing device to:
   detect the absence of traffic on the communication network bus for a set period of time; and
   transmit the signal to the regulator for disabling the regulator in response to determining that the absence of traffic on the communication network bus has been detected for the set period of time.

8. The system of claim 6, wherein the memory device further comprises instructions executable by the processing device for causing the processing device to:
   detect a presence or an absence of a data error on the communication network bus in response to detecting the presence of traffic on the communication network bus; and
   transmit the signal to the regulator for disabling the regulator in response to detecting the presence of the data error on the communication network bus.

9. The system of claim 8, wherein the memory device further comprises instructions executable by the processing device for causing the processing device to:
   monitor the presence of the data error on the communication network bus for a set period of time; and
   transmit the signal to the regulator for disabling the regulator in response to determining that the presence of the data error on the communication network bus has been detected for the set period of time.

10. The system of claim 1, wherein the control device comprises a variable speed pump.

11. A method for detecting auxiliary power detection for a pool or spa system, the method comprising:
   coupling a control device to an auxiliary device via a communication network bus;
   powering, by a power source, the control device;
   receiving, by a regulator communicatively coupled to the power source, voltage from the power source when the regulator is enabled;
   detecting, by a power detector communicatively coupled to the regulator, auxiliary voltage received by the control device from the auxiliary device via the communication network bus; and
   enabling or disabling the regulator based on the detected auxiliary voltage.

12. The method of claim 11, further comprising:
   determining, by the power detector, when the auxiliary voltage received by the control device is above or below a threshold voltage by comparing the detected auxiliary voltage to the threshold voltage, the threshold voltage corresponding to a level of voltage for powering the control device or the auxiliary device; and
   transmitting, by the power detector, a signal to the regulator for enabling or disabling the regulator in response to determining that the detected auxiliary voltage is above or below the threshold voltage.

13. The method of claim 12, wherein transmitting the signal to the regulator comprises:
   transmitting, by the power detector, the signal to the regulator for disabling the regulator in response to determining that the detected auxiliary voltage received by the control device from the auxiliary device is above the threshold voltage.

14. The method of claim 12, further comprising:
   detecting, by the power detector, auxiliary voltage received by the control device from the auxiliary device for a set period of time in response to determining that the detected auxiliary voltage is below the threshold voltage; and
   transmitting, by the power detector, the signal to the regulator for enabling the regulator in response to determining that the auxiliary voltage received by the control device has been detected for the set period of time and the detected auxiliary voltage is below the threshold voltage.

15. The method of claim 12, further comprising:
   detecting, by the power detector, a presence or an absence of traffic on the communication network bus; and
   transmitting, by the power detector, the signal to the regulator for disabling the regulator in response to detecting the absence of traffic on the communication network bus.

16. The method of claim 15, further comprising:
   detecting, by the power detector, the absence of traffic on the communication network bus for a set period of time; and
   transmitting, by the power detector, the signal to the regulator for disabling the regulator in response to determining that the absence of traffic on the communication network bus has been detected for the set period of time.

17. The method of claim 15, further comprising:
   detecting, by the power detector, a presence or an absence of a data error on the communication network bus in response to detecting the presence of traffic on the communication network bus; and
   transmitting, by the power detector, the signal to the regulator for disabling the regulator in response to detecting the presence of the data error on the communication network bus.

18. The method of claim 17, further comprising:
- detecting, by the power detector, the presence of the data error on the communication network bus for a set period of time; and
- transmitting, by the power detector, the signal to the regulator for disabling the regulator in response to determining that the presence of the data error on the communication network bus has been detected for the set period of time.

19. The method of claim 11, wherein coupling the control device to the auxiliary device comprises coupling a variable speed pump to the auxiliary device.

20. The method of claim 11, wherein the auxiliary voltage received by the control device is provided by an auxiliary power source.

* * * * *